United States Patent
Althaus

[11] 3,712,398
[45] Jan. 23, 1973

[54] HYDRAULICALLY OPERABLE DEVICE FOR CHANGING THE TRACK WIDTH OF TRACK-LAYING VEHICLES

[75] Inventor: Ernst Althaus, Dortmund-Kirchhorde, Germany

[73] Assignee: Orenstein & Koppel Aktiengesellschaft, Berlin, Germany

[22] Filed: March 16, 1971

[21] Appl. No.: 124,867

[30] Foreign Application Priority Data

March 19, 1970 Germany.............P 20 13 144.0

[52] U.S. Cl..................................180/9.48
[51] Int. Cl. ................................B62d 55/00
[58] Field of Search..........................180/9.48

[56] References Cited

UNITED STATES PATENTS 2,894,341  7/1959  Amthor.....................180/9.48 X
3,205,961  9/1965  Nolte........................180/9.48
3,494,439  2/1970  Kline........................180/9.48

Primary Examiner—Richard J. Johnson
Attorney—Walter Becker

[57] ABSTRACT

A track laying vehicle in which the tracks at each side of the vehicle are supported on carriages, with the carriages having spars fixed thereto and extending toward the vehicle and slidably supportingly engaging the vehicle, fluid motors connected between opposed spars are reversibly energizable for moving the carriages between innermost and outermost positions on the vehicle. Wedge shaped abutment elements limit the movement of the spars transversely of the vehicle and a lock is provided for locking each spar in adjusted position.

8 Claims, 6 Drawing Figures

PATENTED JAN 23 1973

INVENTOR
Ernst Althaus
By
Austin Dickey

INVENTOR
Ernst Althaus

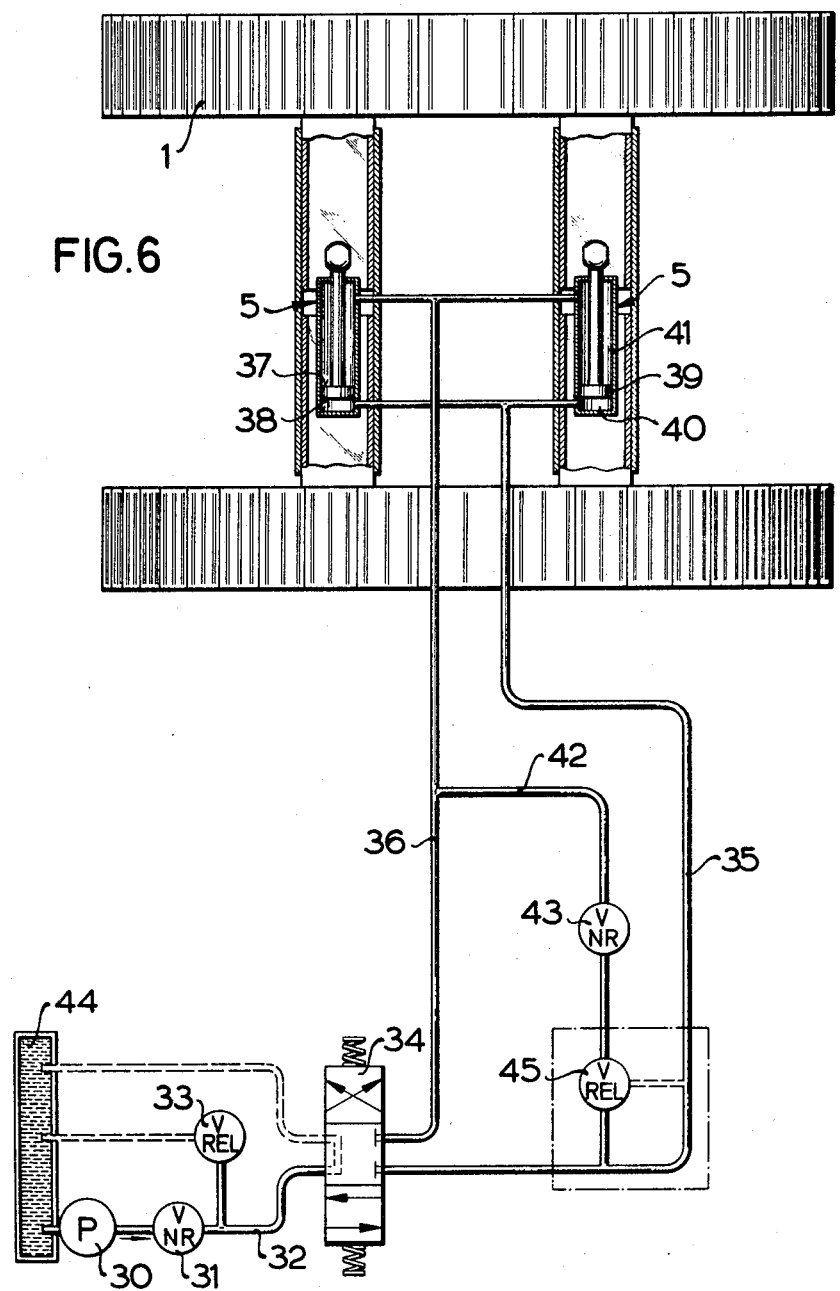

HYDRAULICALLY OPERABLE DEVICE FOR CHANGING THE TRACK WIDTH OF TRACK-LAYING VEHICLES

The present invention relates to a hydraulically operable device for changing the track width of track-laying vehicles with two arms or spars connected at a right angle to two carriage supports and arranged alongside the same, and with a base frame which receives the two arms and interconnects the two carriages while hydraulic cylinders for varying the track width are movably mounted in said arms.

The widening of the track of vehicles becomes necessary when the stability of the vehicle has to be increased in view of the operation of the respective implement supported by the vehicle or when the vehicle has to bridge a ditch or has to drive over uneven terrain. On the other hand, it is necessary to reduce the track width to the dimensions permissible for the transport of the vehicle.

With heretofore known arrangements movable on caterpillars as disclosed, for instance, in U.S. Pat. No. 3,057,571, it is suggested to unscrew the track-laying mechanism from the vehicle frame and to insert intermediate elements in order to widen the track. Such an arrangement is, however, awkward and time consuming during which time the vehicle and the implement supported thereby cannot be used.

According to a further heretofore known track-laying vehicle, as described, for instance, in U.S. Pat. No. 2,763,330, it is necessary for purposes of widening the track, to move out telescopically designed axles to the described length and to do this by hand by means of threaded bolts. For arresting the respective track width, arresting devices are necessary which are arranged parallel to the supporting axles and act by means of manually operable clamping pieces. Inasmuch as the pistons guided one within the other of the telescopic axles must have play, the guiding means are when driving the vehicle continuously subjected to undue stresses and an easy wear. The manual actuation is awkward and time consuming and furthermore coupling elements and intermediate pieces have to be available.

There has also become known a hydraulic device for varying the track width of track-laying vehicles as described in U.S. Pat. No. 2,681,231. The mounting of the caterpillars is in this instance effected by means of telescopically guided profiles. The caterpillars are by a hydraulic cylinder pulled closer to the vehicle frame or are farther spaced apart. To arrest the adjusted elements in their desired position, it is necessary that bores provided in the fixed part of the mounting and in the pulled out profiled part be made to register with each other so that screws or bolts can be inserted. Aside from the fact that it is difficult to bring the bores into alignment by means of the hydraulic device, a second operator is required who has to check the precise alignment of the bores and who inserts the bolts provided for the arresting step.

Moreover, the screws are subjected to considerable stress inasmuch as they have to absorb the lateral forces which during the turning of the vehicle on the spot are particularly high. Additionally it may be mentioned that the telescopic guiding means cannot be journalled without play so that a considerable wear is unavoidable.

It is, therefore, an object of the present invention to provide a device which is applicable for track-laying vehicles of any size and which can be operated by one man in a minimum of time while outside forces are kept away from the system and a play-free mounting of the telescopic part in working condition will be assured.

This object and other objects and advantages of the invention will appear more clearly from the following specification in connection with the accompanying drawings, in which:

FIG. 6 illustrates the hydraulic circuit for actuating the hydraulic cylinder system.

The hydraulically operable device according to the present invention for changing the width of the track of track-laying vehicles is characterized primarily in that at the lower chords of the arms or spars of the carriage support there are provided inserts which have an inclined plane and which cooperate with further inserts detachably connected to the lower chords of the base frame and serving as abutments. This cooperation is such that the cylinders employed for changing the track width move outwardly or inwardly until a certain pressure has been obtained which is limited by check valves until an automatic locking occurs.

According to a further development of the invention, the arms or spars are secured to their respective position in the base frame by means of a clamping eccentric. This clamping eccentric is by means of a pivot surrounded by a spring so mounted on the bottom of a box-shaped support and is adjustable by means of a nut and a manually operable lever that the clamping portion will in both positions engage the inserts which are fixedly connected to the arms or spars.

Figure 3:
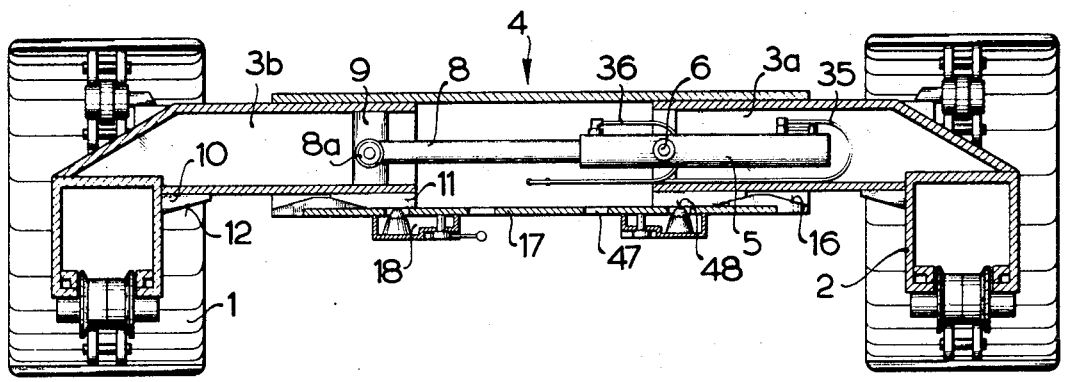
FIG. 3 illustrates on an enlarged scale a longitudinal section through a portion of the base frame showing the arrangement of the arms in moved-out condition.
Figure 4:
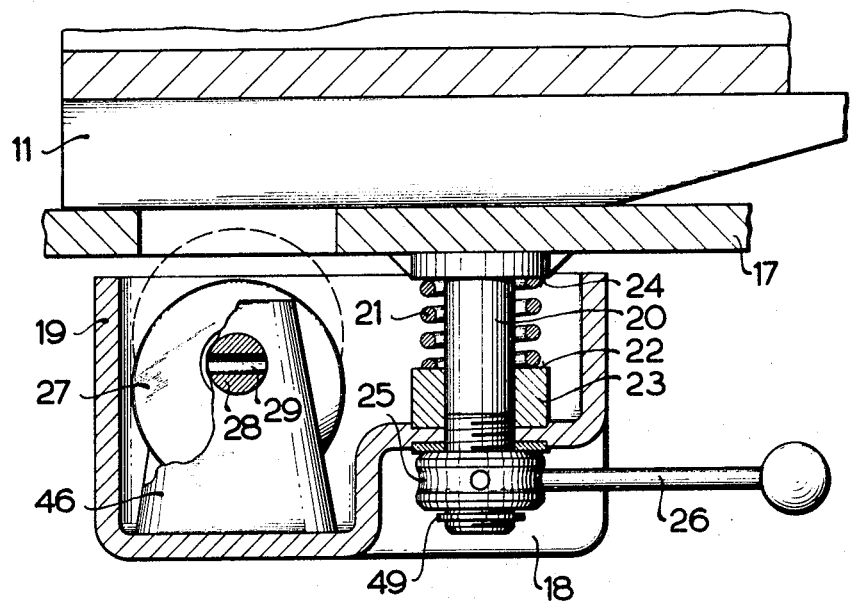
FIG. 4 represents a section through the clamping eccentric system in disengaged condition which system is used for arresting the track in the adjusted condition.
Figure 5:
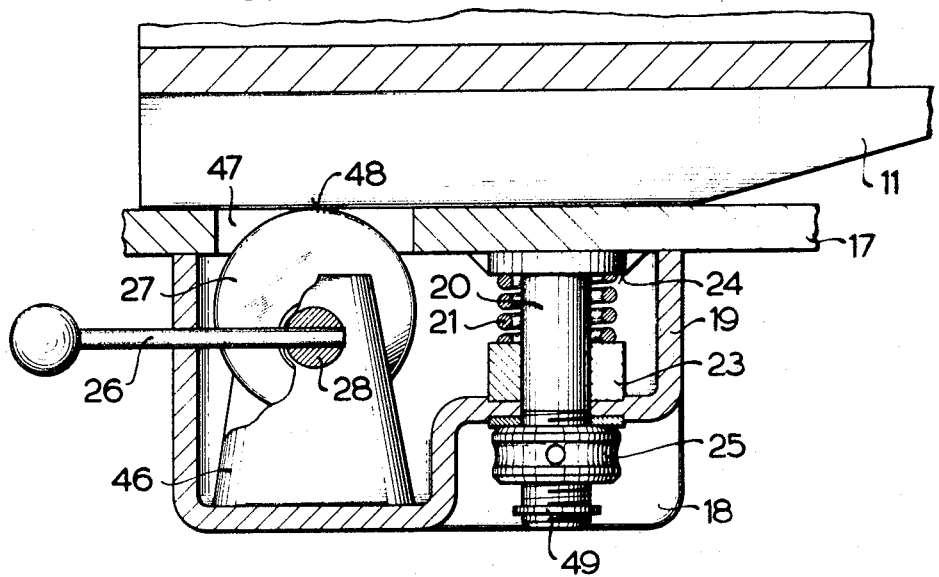
FIG. 5 is a section similar to that of FIG. 4 but showing the clamping eccentric system in engaged position.

Referring now to the drawings in detail, the caterpillar chains 1 (FIG. 1) are mounted on the carriage supports 2 on which the arms or spars 3a and 3b are fixedly arranged at a right angle. The base frame 4 comprises the hollow profiles 4a and 4b. The arms 3a, 3b are displaceably mounted in the hollow profiles 4a which are open at their end faces. Hydraulic cylinders 5 are arranged within the arms or spars 3a and 3b. The mounting of the cylinders 5 is effected by means of pivots 6 which are located approximately at the central portion on the outside of the cylinders. The pivots 6 are rotatably journalled in bearings 7 of the spars 3a. The free ends 8a of the piston rods 8 are likewise movably journalled in the spars 3b and, more specifically, in the bearings 9. Inserts 10 and 11 (FIGS. 2 and 3) are connected to those ends of the spars 3a and 3b which are connected to the carriage supports 2. Each of the inserts 10 and 11 has an inclined surface 12, 13 respectively. Inserts 14 are connected to the inner surface of base frame 4 at the side of the carriage. The inserts 14 are provided with inclined surfaces 15 and 16 which correspond to the inclined surfaces of the inserts 10 and 11. The lower chords 17 of the base frame 4 are provided with safety devices 18 which in addition to the inserts 14 maintain the spars 3a and 3b in the base frame 4 in the respective moved-in or moved-out position. The safety devices 18 comprise the following elements (FIGS. 4 and 5). A box-shaped support 19 is pivotally journalled about the pivot 20 which latter is arranged at the lower chord 17 of the base frame 4. By means of springs 21 which surround the pivot 20 and which rest through the end face 22 of the bearing 23 and the annular surface 24 of pivot 20 against the lower chord 17, the supports 19 are lifted off the lower chords 17 as soon as the nut 25 is loosened by means of the manually operable lever 26. Nut 25 is secured in its position by a safety ring 49.

A bearing 46 in which the eccentric 27 is rotatably journalled is mounted on the bottom of the box-shaped support 19. That end of the axle 28 of the eccentric 27 which protrudes from the bearing 46 is provided with a bore 29 for receiving the manually operable lever 26. This lever is adapted selectively to actuate the eccentric 27 and to loosen or tighten the nut 25. The supply of oil under pressure to the cylinder 5 is effected by a pump 30 (FIG. 6) from which the oil under pressure passes through a check valve 31 and a conduit 32 communicating with the pressure limiting valve 33 into the multi-way valve 34. Depending on the position of the valve 34, oil under pressure passes into conduit 35 or 36 and acts upon the annular surface 37 on the piston surface 38 of piston 9. If, in view of the corresponding position of valve 34, the piston ring surface 37 is acted upon by fluid pressure until the adjusted pressure set by valve 33 has been obtained, which simultaneously represents the maximum pressure of the system, the oil under pressure is displaced from the cylinder chambers 40 into the conduit 35 through valve 34 into the tank 44. When the valve 34 is moved into the opposite direction, the piston surface 28 will receive fluid pressure until the adjusted pressure set by the pressure limiting valve 35 has been reached and the oil under pressure passes from the cylinder chambers 41 into conduits 36 and 42 and the check valve 43 closes while the pressure fluid passes through valve 34 into the tank 44.

Figure 1:
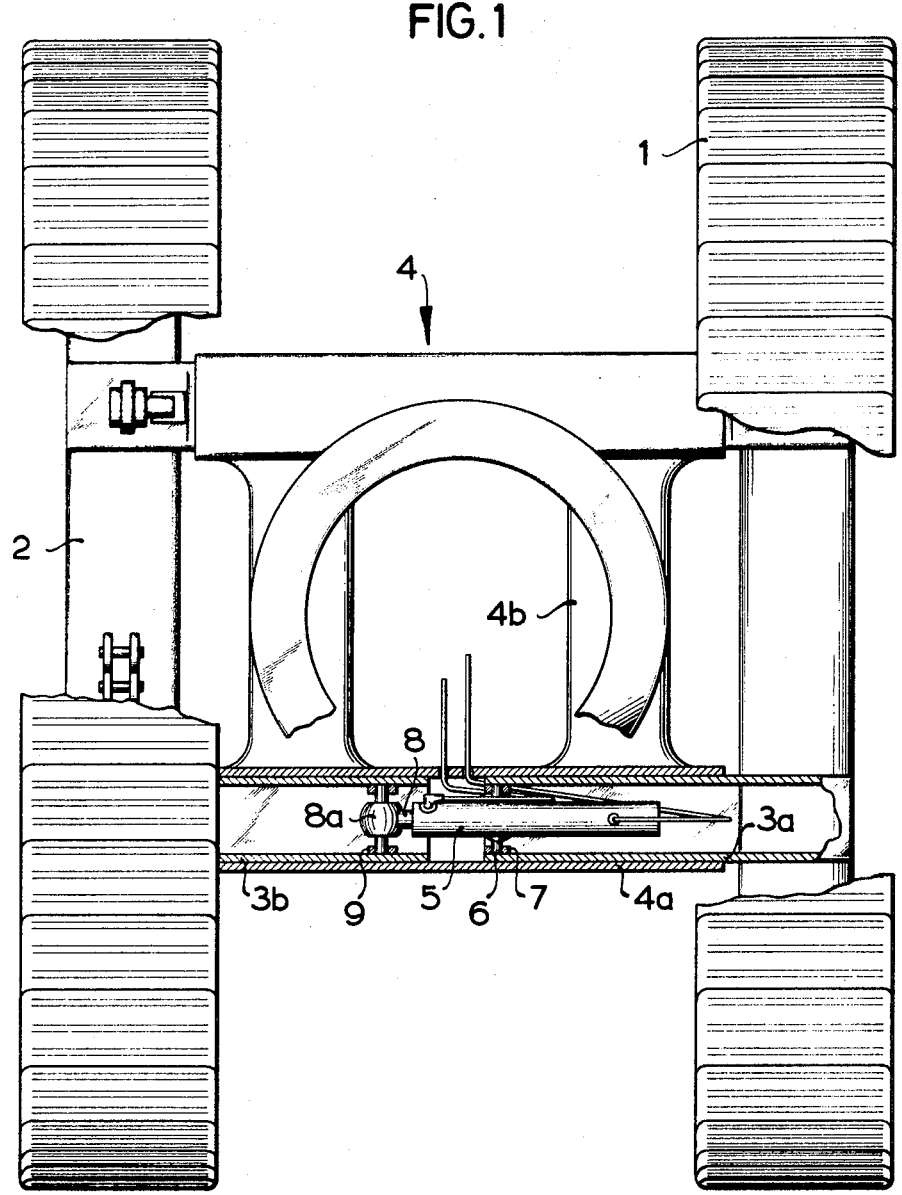
FIG. 1 is a top view of the carriage of a track-laying vehicle with partial sections to show the mounting of a caterpillar chain and the arrangement of a cylinder used for changing the track width.
Figure 2:
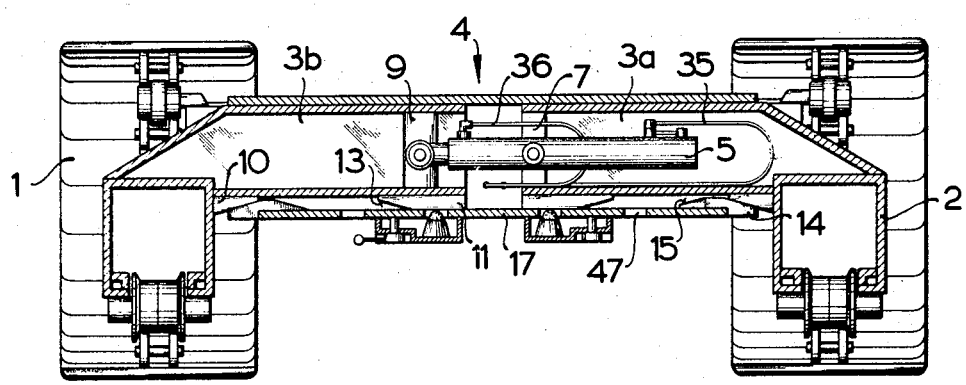
FIG. 2 shows on an enlarged scale a longitudinal section through a portion of the base frame showing the arrangement of the arms in moved-in condition.

The operation of the device according to the invention is as follows. FIGS. 1 and 2 illustrate the starting condition with the moved-in carriage supports 2 and spars 3a and 3b. The track-laying mechanism thus has the track width prescribed for moving on highways and for its transport. If it is desired to increase the track width, the clamping eccentric 27 is turned by lever 26 so that it will be lifted off the insert 11. After one track-laying mechanism has by means of the hydraulically working equipment of the dredge been lifted and is no longer in contact with the ground, the cylinders 5 receive pressure fluid from the cylinder chambers 40 and 41 until the self-locking caused by the inclined planes 12 and 13 of the inserts 10 and 14 has been overcome and the carriage support 2 with the caterpillars 1 has been moved out. When the inserts 11 which are fixedly connected to the spars 3a have reached the inclined surfaces 15 of the inserts 14, the spars 3a enter into a wedging engagement with the base frame 4. For purposes of securing this position of the carriage support 2, the safety means 18 are pivoted about the pivot 20 by an angle of 180° (FIGS. 4 and 5) and the nut 25 is tightened by means of lever 26 until the support 19 firmly engages the lower chord 17 of the base frame 4. Lever 26 is then inserted into the bore 29 of the eccentric 27 and the latter is turned until it passes through the recess 47 of the lower chord 17 and engages the clamping portion 48 of spar 3a and is clamped in view of the eccentricity of eccentric 27; the same working operations take place with the oppositely located track-laying mechanism for purposes of widening the track.

As will be evident from the above, the device according to the present invention brings about that the spars which carry the caterpillars are mounted by a wedging effect in the base frame in a play-free and wear-free manner, and the operation of the device for changing the track width can be carried out by the driver alone.

It is, of course, to be understood that the present invention is, by no means, limited to the particular showing in the drawings but also comprises any modifications within the scope of the appended claims.

What is claimed is:

1. In a track laying vehicle: a vehicle frame, carriage means at each side of the frame supporting said tracks, spar means fixed to each said carriage means and extending perpendicular to the plane in which the respective track runs and toward the said frame, said frame reciprocably receiving and supportingly engaging said spar means, hydraulic cylinder-piston means extending between said spar means and reversibly energizable for moving said spar means and the carriage means connected thereto laterally of said frame between innermost and outermost positions, and cooperating elements of abutment means on said spar means and said frame interengageable in the said position of said spar means, the abutment elements on each spar means comprising spaced elements on the bottom of the respective spar means and each having the lower side inclined upwardly at the end facing the other thereof, the abutment element on said frame for each spar means comprising an element disposed between the said elements on the respective spar means and having the upper surface inclined downwardly toward each end to cooperate with the inclined surfaces of the said elements on the spar means.

2. A tracking laying vehicle according to claim 1 in which said abutment elements have inclined surfaces.

3. A track laying vehicle according to claim 1 which includes a source of hydraulic fluid for energizing said hydraulic cylinder-piston means, and pressure limiting valve means connected to said source.

4. A track laying vehicle according to claim 1 in which said carriage means on each side of the frame comprises a pair of longitudinally spaced carriages, a support frame extending between and fixed to each pair of carriages, said spar means comprising a pair of longitudinally spaced spars fixed to each support frame, the spars on one side of the frame being axially aligned with the spars on the other side of the frame, each cylinder-piston means comprising a cylinder journaled in one spar and a piston journaled in the spar aligned therewith on the other side of the frame.

5. A track laying vehicle according to claim 1 in which the angle of said inclined surfaces is such that the said elements lock together.

6. In a track laying vehicle: a vehicle frame, carriage means at each side of the frame supporting said tracks, spar means fixed to each said carriage means and extending perpendicular to the plane in which the respective track runs and toward the said frame, said frame reciprocably receiving and supportingly engaging said spar means, hydraulic cylinder-piston means extending between said spar means and reversibly energizable for moving said spar means and the carriage means connected thereto laterally of said frame between innermost and outermost positions, and cooperating elements of abutment means on said spar means and said frame interengageable in the said position of said spar means, and clamping means operable for clamping each said spar means to the said frame in each adjusted position of said spar means.

7. A track laying vehicle according to claim 6 in which each clamping means comprises a box-like support connected to said frame, a clamp member in said support engageable with one of the said elements on the respective said spar means.

8. A track laying vehicle according to claim 7 in which said support is pivotal on said frame and said clamp member engages the same said element in each position of the respective spar means.

* * * * *